Dec. 13, 1966  F. J. ARCHER ET AL  3,291,440

FLUID-OPERATED VALVE

Filed June 1, 1964  2 Sheets-Sheet 1

INVENTORS.
Farley J. Archer
Charles R. Archer
BY John A. Hamilton
Attorney.

Dec. 13, 1966    F. J. ARCHER ET AL    3,291,440
FLUID-OPERATED VALVE

Filed June 1, 1964    2 Sheets-Sheet 2

INVENTORS.
Farley J. Archer
Charles R. Archer
BY John A. Hamilton
Attorney.

United States Patent Office 3,291,440
Patented Dec. 13, 1966

3,291,440
FLUID-OPERATED VALVE
Farley J. Archer, 18503 Oakmoor, Saugus, Calif., and Charles R. Archer, 2715-C Santa Monica Blvd., Santa Monica, Calif.
Filed June 1, 1964, Ser. No. 371,696
6 Claims. (Cl. 251—61)

This invention relates to new and useful improvements in valves, and has particular reference to valves adapted to be controlled by air, oil or other fluid supplied thereto independently of the fluid in the pipe or other conduit controlled by the valve itself.

Among important objects of the present invention are the provision of a valve of the character described which has a straight-through flow passage for better flow characteristics, but which has accurate throttling control, which will positively prevent intermixture of the controlled and controlling fluids, which has no sealed working joints which might develop leakage, and which consists of few elements so as to be inexpensive to manufacture and simple to maintain.

Another object is the provision of a valve of the character described wherein the valve is moved in one direction by fluid-actuated means and in the opposite direction by springs, and wherein the springs and fluid-actuated means are easily interchangeable so that the valve may selectively be either closed or opened by the springs in the event of failure of the operating fluid pressure, and either closed or opened by fluid pressure, as safety and convenience may dictate.

A further object is the provision of a valve of the character described wherein the operating elements may be removed for servicing or the like without disturbing the valve itself and without requiring a shutdown in the pipe controlled by said valve.

Other objects are simplicity and economy of construction, efficiency and dependability of operation, and the virtually complete absence of push rods or any other parts the wearing of which would impair their accuracy and require servicing of the valve.

With these objects in view, as well as other objects which will appear in the course of the specification, reference will be had to the accompanying drawing, wherein.

Figure 1:
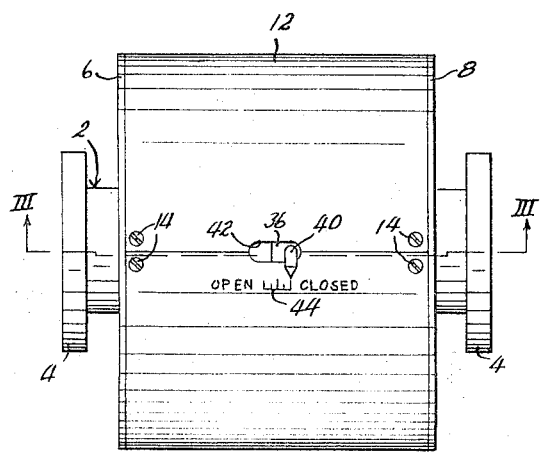
FIG. 1 is a top plan view of a valve embodying the present invention.
Figure 2:
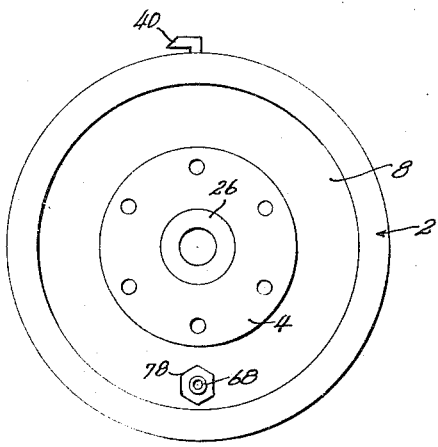
FIG. 2 is an end elevational view of the valve as shown in FIG. 1.
Figure 3:
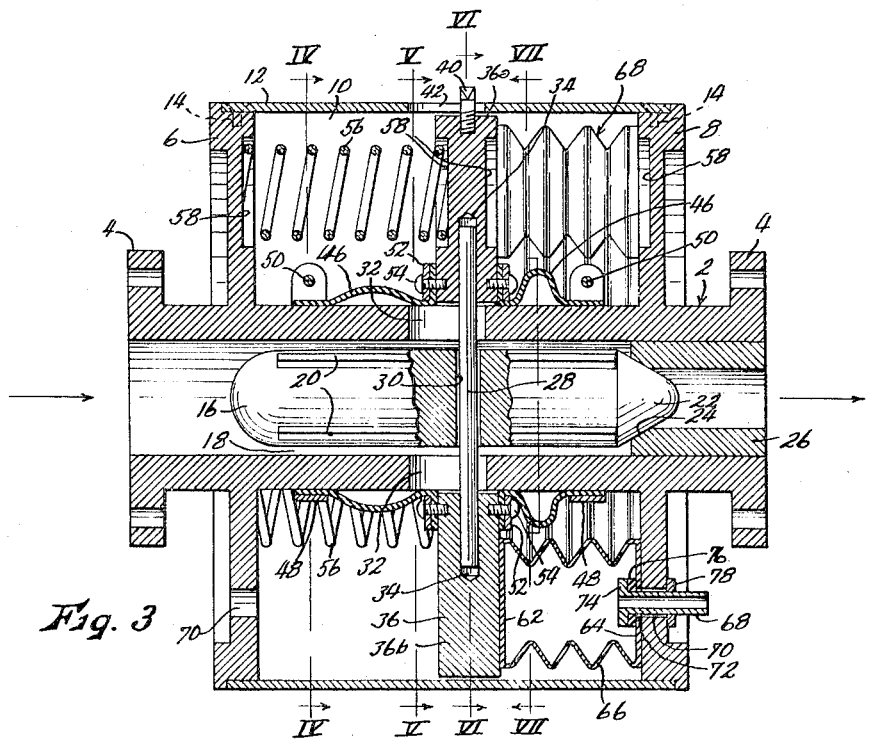
Figure 4:
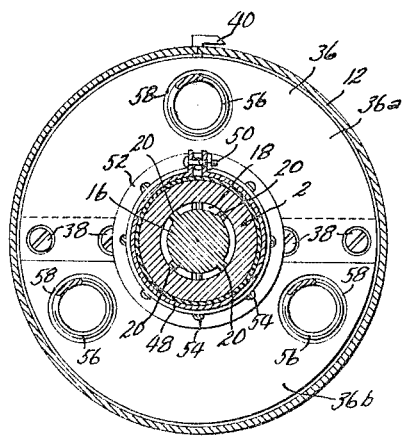
Figure 5:
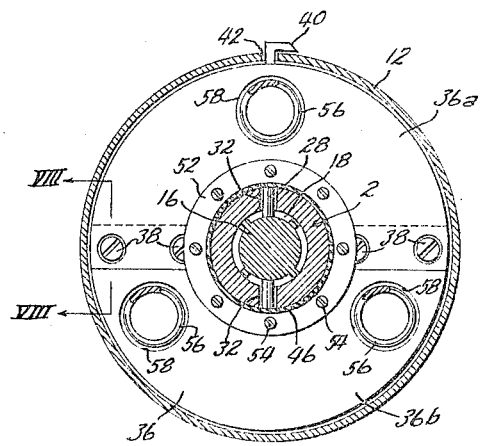
Figure 6:
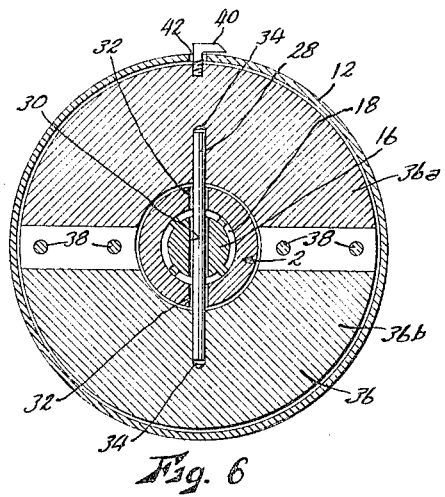
Figure 7:
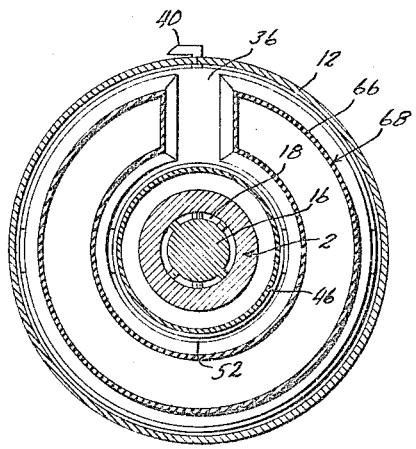
Figure 8:
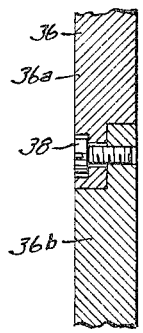

FIG. 3 is an enlarged sectional view taken on line III—III of FIG. 1, with parts left in elevation and partially broken away, FIG. 4 is a reduced sectional view taken on line IV—IV of FIG. 3, FIG. 5 is a reduced sectional view taken on line V—V of FIG. 3, FIG. 6 is a reduced sectional view taken on line VI—VI of FIG. 3, FIG. 7 is a reduced sectional view taken on line VII—VII of FIG. 3, and FIG. 8 is an enlarged fragmentary sectional view taken on line VIII—VIII of FIG. 5.

Like reference numerals apply to similar parts throughout the several views, and the numeral 2 applies generally to the body of the valve, said body having the form of a straight cylindrical tube having a bolt flange 4 formed integrally therewith at each end thereof for connecting it in a pipeline or the like to be controlled, although threaded or other types of end connections could obviously be employed if desired. Fluid flow is ordinarily in the direction of the arrows in FIG. 3. The valve body also includes a pair of circular end walls 6 and 8 formed integrally therewith and disposed concentrically therewith in spaced apart relation whereby to form a chamber 10 therebetween in which operating elements to be described are contained. Said chamber is further enclosed by a cylindrical sheet metal wall 12 having its axis parallel to body 2 with its respective ends engaging and being supported by the peripheries of end walls 6 and 8. Wall 12 is longitudinally split along one side with the edges brought together at the top of the valve and secured to end walls 6 and 8 by screws 14, and is sufficiently flexible that when screws 14 are removed, it may be expanded and removed from the valve body to provide access to chamber 10.

Disposed in valve body 2 is a valve plunger 16 of generally cylindrical shape with its axis parallel to the axis of the body, said plunger being of smaller diameter than the internal diameter of the valve body whereby to provide an annular flow passage 18 therebetween, but being supported coaxially in said body by a plurality of longitudinally extending ribs 20 formed thereon and slidably engaging the internal bore of the body, whereby said plunger may be moved longitudinally in the body. Said plunger is provided at one end with a conically tapered nose 22 adapted to be moved into and out of a correspondingly tapered seat 24 formed in a tubular insert 26 fixed in the associated end of the bore of the valve body, whereby to open or close the valve.

Plunger 16 is moved by means of an operating rod 28 extending through a hole 30 formed diametrically through said plunger intermediate its ends. Said rod extends outwardly from said plunger in both directions passing through a pair of diametrically opposed, longitudinally elongated slots 32 formed in the valve body intermediate end walls 68, and into chamber 10. Each extended end of said rod is engaged in a bore 34 formed radially in an annular operating plate 36. Said operating plate is a flat annular disc disposed parallel to end walls 6, having an internal diameter surrounding valve body 2 and freely slidable thereon, and an external diameter slightly less than the internal diameter of housing wall 12. As shown, plate 36 is split diametrically in two halves 36a and 36b, rigidly but detachably connected by screws 38, in order to permit it to be assembled around the valve body and operating rod 28. It will be seen that the longitudinal position of the operating plate with respect to the valve body is responsive to the degree of opening or closure of the valve, and is indicated externally by a pointer 40 fixed in the edge of plate 36 and extending outwardly through a longitudinally elongated slot 42 formed in housing wall 12, said finger indicating the position of the valve on a scale 44 imprinted on the exterior surface of said housing wall (see FIG. 1).

Chamber 10 of the housing is sealed against the entry therein of fluid from the interior of the valve body by a pair of essentially tubular seals 46 surrounding the valve body respectively at opposite sides of plate 36, said seals being formed of rubber or other flexible material. The outer end of each seal is clamped tightly about the valve body by a clamp ring 48 secured by a bolt 50, and the inner end of each seal is secured tightly against the adjacent face of plate 36 by an annular clamp ring 52 secured to said plate by a plurality of screws 54. Slots 32 of the body member are disposed between the clamp rings 48, so that any fluid escaping from the valve body through said slots is contained within the two sealing tubes 46. Said tubes must of course be of sufficient strength to contain any pressure the valve is designed to control, but are sufficiently flexible to permit movement of the operating plate to open and close the valve. FIG. 3 shows the valve in its closed position.

As illustrated, operating plate 36 is resiliently biased in a direction to close the valve, or to the right as viewed in FIG. 3, by a plurality of helical springs 56 disposed parallel to the axis of the valve body in angularly spaced relation thereabout, within chamber 10 and between said operating plate 36 and end wall 6. Said springs are positioned by the fact that the ends thereof are contained in shallow sockets 58 formed therefor in the confronting faces of said operating plate and end wall. For permitting reversal of the valve action, as will be described, the confronting faces of the operating plate and end wall 8 are also provided with a matching set of said sockets.

As illustrated, operating plate 36 is adapted to be moved in a direction to open the valve, or to the left as viewed in FIG. 3, by a bellows 60 disposed between plate 36 and end wall 8. Said bellows is substantially annular, surrounding the valve body within chamber 10, but being split at one point of its circumference, as best shown in FIG. 7, and sufficiently flexible that its ends may be spread apart to permit passage thereof over the valve body to remove the bellows when desired. Said bellows consists of a pair of split annular end walls 62 and 64 (see FIG. 3) adapted respectively to lie flat against plate 36 and end wall 8, and accordian-folded side walls 66 interconnecting the entire peripheries of said end walls, whereby the bellows will expand longitudinally of the valve body when fluid pressure is supplied to the interior thereof. Fluid is supplied to said bellows through a tubular stem 68 extending through a hole 70 provided therefor in end wall 8 and through a hole 72 provided therefor in bellows end wall 64, said stem being provided at its inner end with an enlarged head 74. A sealing washer 76 is adapted to be compressed between head 74 and end wall 64 by the action of a lock nut 78 threaded on stem 68 externally of end wall 8. Said stem is adapted to be connected to any suitable source of air or other fluid under pressure to operate the valve. End wall 6 is also provided with a hole 70 for receiving stem 68 when the valve action is reversed.

In operation, it will be seen that air or other control fluid supplied under pressure to stem 68 will enter into and cause expansion of bellows 68, whereby operating plate 36 is forced to the left against springs 56 to open the valve, the degree of opening being indicated by pointer 40 on scale 44. The tapered form of valve nose 22 and seat 44 permits accurate regulation of flow, and may be closely controlled by the degree of pressure supplied to bellows 68. Springs 56 also act as dampers to prevent too rapid opening of the valve, as might otherwise occur particularly if valve plunger 16 is operating against only a very slight pressure. Upon release of the fluid pressure in bellows 68, the valve is immediately and automatically closed by springs 56. This closure will also occur automatically in the event bellows 68 should rupture. The latter feature may in some valve applications be an important safety feature. The double seal provided by seals 46 and bellows 68 insures against possible intermixture of the fluid controlled by the valve and the fluid contained in the bellows, which in certain circumstances could be undesirable or even dangerous. Such intermixture could occur only if bellows 68 and seals 46 ruptured simultaneously, which is extremely unlikely. If either ruptures separately, the fluid thereby allowed to escape simply passes to atmosphere through slot 42 of housing wall 12, or through other openings which could be provided in said wall, or through hole 70 of end wall 6.

In some applications, it may be desirable that the valve be closed by the action of the bellows 68, and opened by springs 56, so as to have a normal open position when no pressure is applied to the bellows. In the present structure, this reversal of operation may be accomplished easily by removing screws 14 and housing wall 12, removing springs 56, removing lock nut 78, collapsing the bellows to withdraw stem 68 from hole 72 of end wall 8, spreading the split ends of the bellows and withdrawing it from chamber 10, then reinserting bellows 68 between operating plate 36 and end wall 6 so that stem 68 engages in hole 70 of end wall 6, reapplying lock nut 78, inserting springs 56 between plate 36 and end wall 8, and reapplying housing wall 12. This entire operation may be performed without removing the valve from service, and without permitting the escape of fluid from housing 2. The valve remains closed by fluid pressure against plunger 16 whenever the springs and bellows are removed, and if it is desired that the valve remain closed when springs 56 are inserted between plate 36 and end wall 8, pressure may be supplied to bellows 68 before the springs are inserted. This arrangement also permits replacement or servicing of the operating elements of the valve, namely the bellows and springs, without removing the valve from service.

While we have shown and described a specific embodiment of our invention, it will be readily apparent that many minor changes of structure and operation could be made without departing from the spirit of the invention as defined by the scope of the appended claims.

What we claim as new and desire to protect by Letters Patent is:

1. A valve comprising:
   (a) a tubular body member having an axially opening valve seat formed therein,
   (b) a valve plunger carried for axial movement in said body member to and from said seat to close and open said valve,
   (c) a housing surrounding said body member and including a pair of spaced apart end walls extending outwardly from said body member and affixed thereto,
   (d) a rod carried by said plunger and extending laterally therefrom through an aperture of said body member into said housing intermediate said end walls thereof,
   (c) means sealing said body member aperture around said rod,
   (f) an annular plate surrounding said body member and being axially slidable therealong intermediate said housing end walls, said rod being engaged by said plate,
   (g) compression springs interposed between said plate and one of said end walls whereby to bias said plate in one direction, and
   (h) an expansible fluid bellows disposed between said plate and the other of said end walls, whereby to move said plate in the opposite direction against said springs whenever fluid under pressure is supplied thereto.

2. A valve as recited in claim 1 wherein said springs and said bellows are removable and interchangeable, whereby said springs bias said plate in the same direction it was previously urged by said bellows, and said bellows urge said plate in the direction it was previously biased by said springs.

3. A valve as recited in claim 2 wherein the confronting faces of said plate and both of said end walls are provided with aligned shallow sockets for receiving and positioning the ends of said springs.

4. A valve as recited in claim 2 wherein said bellows is of annular form, surrounding said valve body and being expansible in a direction parallel to its axis, said bellows being split at one point of its circumference and being flexible whereby the ends thereof at said split may be spread apart to pass over said valve body.

5. A valve as recited in claim 2 wherein the confronting faces of said plate and both of said end walls are provided with aligned shallow sockets for receiving and positioning the ends of said springs, and wherein said bellows is of annular form, surrounding said valve body and being expansible in a direction parallel to its axis, said bellows being split at one point of its circumference and being flexible whereby the ends thereof at said split may be spread apart to pass over said valve body.

6. A valve as recited in claim 1 wherein said housing includes a cylindrical wall supported by said end walls in concentric relation to said body member and surounding said plate, and with the addition of a pointer carried by said plate and projecting radially therefrom through a slot formed in said housing wall, said wall having a scale on the exterior surface thereof and adapted to be read in connection with said pointer to indicate the position of said valve plunger.

References Cited by the Examiner

UNITED STATES PATENTS 2,708,563 5/1955 Backman et al. ____ 251—340 X

FOREIGN PATENTS 568,730 7/1958 Belgium.
1,056,286 10/1953 France.

M. CARY NELSON, *Primary Examiner.*

ARNOLD ROSENTHAL, *Assistant Examiner.*